(12) United States Patent
Dunstan

(10) Patent No.: US 10,268,815 B2
(45) Date of Patent: Apr. 23, 2019

(54) AUTHENTICATION OF A MULTIPLE PROTOCOL CONNECTION

(71) Applicant: Intel Corporation, Santa Clara, CA (US)

(72) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/751,825

(22) Filed: Jun. 26, 2015

(65) Prior Publication Data

US 2016/0378971 A1     Dec. 29, 2016

(51) Int. Cl.
*G06F 13/10*    (2006.01)
*G06F 13/42*    (2006.01)
*G06F 21/44*    (2013.01)

(52) U.S. Cl.
CPC ............ *G06F 21/44* (2013.01); *G06F 13/102* (2013.01); *G06F 13/4282* (2013.01)

(58) Field of Classification Search
CPC .... G06F 21/44; G06F 13/102; G06F 13/4282; G06F 13/385; G06F 13/4022; G06F 2213/0042; G06F 13/00; G06F 13/382; G06F 13/4072; G06F 1/169; G06F 3/0679; G06F 1/3215; G06F 1/325
See application file for complete search history.

(56) References Cited

U.S. PATENT DOCUMENTS

| | | | | |
|---|---|---|---|---|
| 4,590,551 A * | 5/1986 | Mathews | ............... | G06F 13/385 703/25 |
| 6,842,462 B1 * | 1/2005 | Ramjee | ............... | H04L 63/0823 370/328 |
| 7,028,114 B1 * | 4/2006 | Milan | ..................... | H04L 12/44 455/226.1 |
| 7,090,541 B1 * | 8/2006 | Ho | ........................ | H01R 12/721 439/660 |
| 8,369,785 B2 * | 2/2013 | Dorogusker | ......... | H01R 31/065 455/41.1 |
| 8,578,161 B2 * | 11/2013 | Smith | ................... | H04L 9/3252 380/30 |
| 9,600,433 B2 * | 3/2017 | Mandhani | ............. | G06F 13/404 |
| 9,672,127 B2 * | 6/2017 | Fluet | ..................... | G06F 11/221 |
| 2003/0097503 A1 * | 5/2003 | Huckins | ................ | G06F 13/385 710/104 |
| 2004/0128542 A1 * | 7/2004 | Blakley, III | ........ | H04L 63/0281 726/12 |
| 2004/0156495 A1 * | 8/2004 | Chava | .................... | H04L 45/00 379/392 |
| 2005/0251589 A1 | 11/2005 | Wang | | |

(Continued)

OTHER PUBLICATIONS

PCT International Search Report and Written Opinion, PCT Application No. PCT/US2016/029145, dated Aug. 9, 2016, 14 pages.

*Primary Examiner* — Jason K Gee
*Assistant Examiner* — Shu C Gao
(74) *Attorney, Agent, or Firm* — International IP Law Group, P.L.L.C.

(57) ABSTRACT

An apparatus is described herein. The apparatus includes a controller and a proxy entity. The controller is to detect a peripheral device and authenticate the peripheral device according to a first protocol. The proxy entity that is to configure the peripheral device in an operable protocol in response to the authentication.

22 Claims, 8 Drawing Sheets

(56) References Cited

U.S. PATENT DOCUMENTS

| | | | |
|---|---|---|---|
| 2006/0156415 A1* | 7/2006 | Rubinstein | G06F 21/445 726/27 |
| 2008/0003988 A1* | 1/2008 | Richardson | H04L 29/06027 455/414.3 |
| 2008/0005409 A1* | 1/2008 | Kolokowsky | G06F 13/385 710/62 |
| 2011/0161661 A1* | 6/2011 | Medvinsky | H04L 63/0823 713/156 |
| 2011/0314288 A1* | 12/2011 | Yogev | G06F 21/31 713/172 |
| 2012/0030753 A1* | 2/2012 | Bas | G06F 21/85 726/16 |
| 2012/0131353 A1* | 5/2012 | Nasir | G06F 21/42 713/189 |
| 2013/0332635 A1* | 12/2013 | Bolton | H04M 1/7253 710/105 |
| 2014/0032907 A1 | 1/2014 | Smith et al. | |
| 2014/0053256 A1 | 2/2014 | Soffer et al. | |
| 2014/0068280 A1* | 3/2014 | Yoshimi | G09C 1/00 713/194 |
| 2014/0195217 A1* | 7/2014 | Myrick | G06F 17/5009 703/21 |
| 2015/0370299 A1* | 12/2015 | Waters | G06F 1/26 713/310 |
| 2016/0062935 A1* | 3/2016 | Talmola | G06F 1/266 710/306 |

* cited by examiner

300A

400

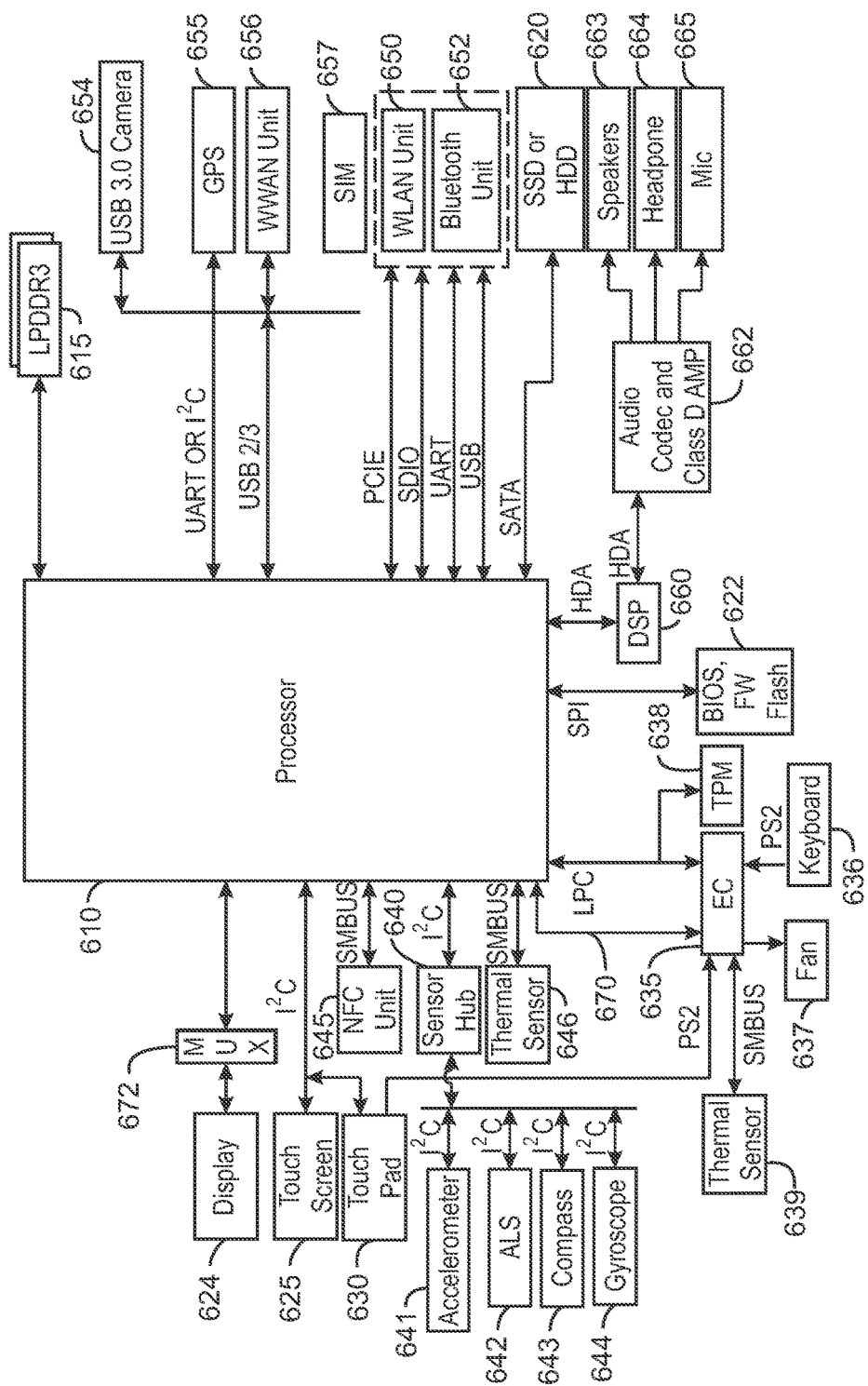

AUTHENTICATION OF A MULTIPLE PROTOCOL CONNECTION

TECHNICAL FIELD

The present techniques relate generally to authentication. More specifically, the present techniques relate to authentication of a peripheral device supporting multiple protocols.

BACKGROUND ART

A connectors to computing devices can be configured to support multiple protocols. For example, the USB Type-C Cable and Connector Specification Revision 1.1, Apr. 2, 2015 provides standards for a connector that can be configured for several operational modes, including but not limited to protocols such as the Universal Serial Bus Revision 3.1 Specification (USB3) released on Jul. 26, 2013; VESA DisplayPort Alt Mode on USB Type-C Standard Version 1.0, released Sep. 22, 2014; the Universal Serial Bus 2.0 Specification (USB2) released April 2000, and; Thunderbolt, released Feb. 24, 2011, for example.

BRIEF DESCRIPTION OF THE DRAWINGS

FIG. 6 is a block diagram of components present in a computer system in accordance with an embodiment of the present invention.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
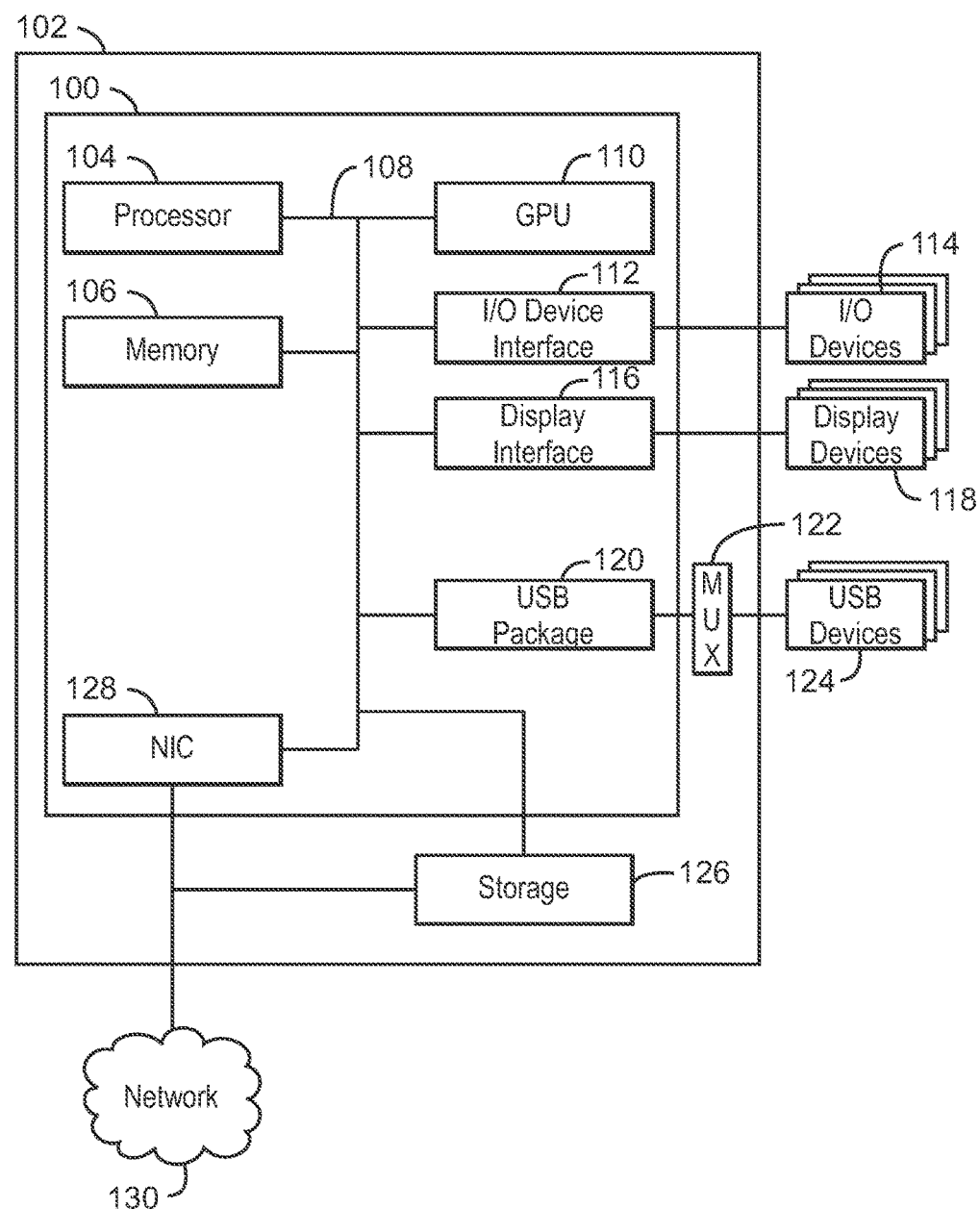
FIG. 1A is a block diagram of a system on chip (SoC) on a printed circuit board (PCB)

Peripheral devices are often vulnerable to attack by malicious code. For example, thumb drives have been distributed with various key loggers and malware. As used herein, malware includes any sort of malicious code, including but not limited to computer viruses, worms, rootkits, Trojans, and spyware. Malware present on a peripheral device can spread to a computing system through the particular communication protocol used by the peripheral device. For example, malware can cause a thumb drive impersonate a keyboard and type malicious commands into a victim's computer, or corrupt files with malware as they're copied from the thumb drive to a PC. Malware can also cause a non-keyboard device to log key strokes to obtain passwords, financial information, and other sensitive data. In another example, a device may be inserted between a host and a device in order to read/log keystrokes and can inject keystrokes for man in the middle attack. These skimming devices may also be inserted between a keyboard and a host device.

In an effort to secure peripheral devices, some peripheral devices require a verified fingerprint or password for access to the peripheral device. Moreover, there are secure keyboards prevent unauthorized access to key strokes. However, with the introduction of physical connections supporting multiple protocols, Specifications, and Standards, the number of possible malware attack points or attack surfaces also increases. For example, the USB Type-C Cable and Connector Specification Revision 1.1, Apr. 2, 2015 enables a single connector to support a number of protocols. Thus, while prior malware attacks could be limited to, for example, USB devices, with the Type-C connector and its ability to carry other protocols such as Thunderbolt, Display Port or Mobile High-Definition Link (MHL) and with Type-C sideband bus (USB Power Delivery) there are many more ways and places for hackers to attack.

Embodiments described herein authentication of a peripheral device supporting multiple protocols. The present techniques provide a solution to USB authentication, and more specifically a solution to the new protocols that are sharing a single connector. In embodiments, a peripheral device is authenticated using one input/output protocol, before allowing the multi-protocol connector to be reconfigured to support another protocol. In the case of a USB Type-C connector, the device may be authenticated using USB2, which is present on all devices including a Type-C connector. Moreover, a Type-C connector may also use USB PD to authenticate on simple devices such as power supplies. In embodiments, USB PD can be used when a device is directly connected to a host port. However, but when a device connected to a port expander such as a USB hub, USB PD communications to be translated into/out of the USB domain for purposes of authentication. USB3 may also be used to authenticate a peripheral device via a Type-C connector. The host can be simplified, as the host needs only support one methodology to authenticate a device regardless, of the protocol that is eventually run over the USB Type-C connector. Moreover, it simplifies device design as a common silicon can be used by many types of devices that support multiple protocols.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms, microprocessors, servers, server farms, or other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

FIG. 1 is a block diagram of a system on chip (SoC) 100 on a printed circuit board (PCB) 102. The SoC 100 and PCB 102 may be components of, for example, a laptop computer, desktop computer, Ultrabook, tablet computer, mobile device, mobile phone, or server, among others. The SoC 100 may include a central processing unit (CPU) 104 that is configured to execute stored instructions, as well as a memory device 106 that stores instructions that are executable by the CPU 104. The CPU may be coupled to the memory device 106 by a bus 108. Additionally, the CPU 104 can be a single core processor, a multi-core processor, a computing cluster, or any number of other configurations. Furthermore, the SoC 100 may include more than one CPU 104.

The SoC 100 may also include a graphics processing unit (GPU) 110. As shown, the CPU 104 may be coupled through the bus 108 to the GPU 110. The GPU 110 may be configured to perform any number of graphics functions and actions. For example, the GPU 110 may be configured to render or manipulate graphics images, graphics frames, videos, or the like, to be displayed to a user of the SoC 100. The memory device 106 can include random access memory (RAM), read only memory (ROM), flash memory, or any other suitable memory systems. For example, the memory device 106 may include dynamic random access memory (DRAM).

The CPU 104 may be connected through the bus 108 to an input/output (I/O) device interface 112 configured to connect with one or more I/O devices 114. The I/O devices 114 may include, for example, a keyboard and a pointing device, wherein the pointing device may include a touchpad or a touchscreen, among others. The I/O devices 114 may be built-in components of a platform including the SoC 100, or may be devices that are externally connected to a platform including the SoC 100. In embodiments, the I/O devices 114 may be a keyboard or a pointing device that is coupled with the I/O device interface 122 via a multiple protocol connection, such as a USB Type-C connection, similar to the USB package 120, MUX 122, and USB devices described below.

The CPU 104 may also be linked through the bus 108 to a display interface 116 configured to connect with one or more display devices 118. The display devices 118 may include a display screen that is a built-in component of a platform including the SoC 100. Examples of such a computing device include mobile computing devices, such as cell phones, tablets, 2-in-1 computers, notebook computers or the like. The display device 118 may also include a computer monitor, television, or projector, among others, that is externally connected to the SoC 100. In embodiments, the display devices 118 may be a DisplayPort device that is coupled with the display interface 116 interface via a multiple protocol connection, such as a USB Type-C connection, similar to the USB package 120, MUX 122, and USB devices described below.

The USB package 120 may include a transmitter and receiver in order to transmit and receive USB data. The USB package 120 may also include components necessary to implement the USB Battery Charging Specification, USB On-the-Go Specification, and the USB Power Delivery Specification, and the USB Type-C Specification. The PCB 102 may also include components to implement the various USB Specifications. Data from the USB package 120 may be sent to a multiplexer (MUX) 122 and on to a plurality of USB devices 124. The MUX 122 may be used to select between various USB features enabled by the USB package 120. For example, the MUX 122 may be used to implement USB2, USB 3.1, USB Battery Charging, USB Power Delivery, HDMI, DisplayPort, or PCIe, among others. The MUX 122 may also enable flipping of the data signals. Specifically, the MUX 122 can map the signals in a consistent manner regardless of the orientation of the plug.

In embodiments, the plurality of peripheral devices such as I/O devices 114, display devices 118, and USB devices 124 be authenticated using a first domain or protocol. After authentication in the first domain or protocol, the peripheral devices can be released to operate in the desired operating domain. A number of authentication techniques may be used, such as mutual authentication, PKI, or other crypto techniques.

The SoC 100 may also be coupled with a storage device 126. The storage device may be a component located on the PCB 102. Additionally, the storage device 126 can be a physical memory such as a hard drive, an optical drive, a thumb drive, an array of drives, or any combinations thereof. The storage device 126 may also include remote storage drives. The SoC 100 may also include a network interface controller (NIC) 128 may be configured to connect the SoC 100 through the bus 108, various layers of the PCB 102, and components of the PCB 102 to a network 130. The network 130 may be a wide area network (WAN), local area network (LAN), or the Internet, among others.

It is to be understood that the block diagram of FIG. 1 is not intended to indicate that the SoC 100 is to include all of the components shown in FIG. 1. Rather, the SoC 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate communications between components. For example, embodiments of the present techniques can also be implemented any suitable electronic device, including ultra-compact form factor devices, such as SoC and multi-chip modules. The present techniques may also be used on any electrical cable inside or outside of a computer that is used to carry digital information from one point to another. For example, embodiments of the present techniques may be used for connecting disk drives.

Figure 1B:
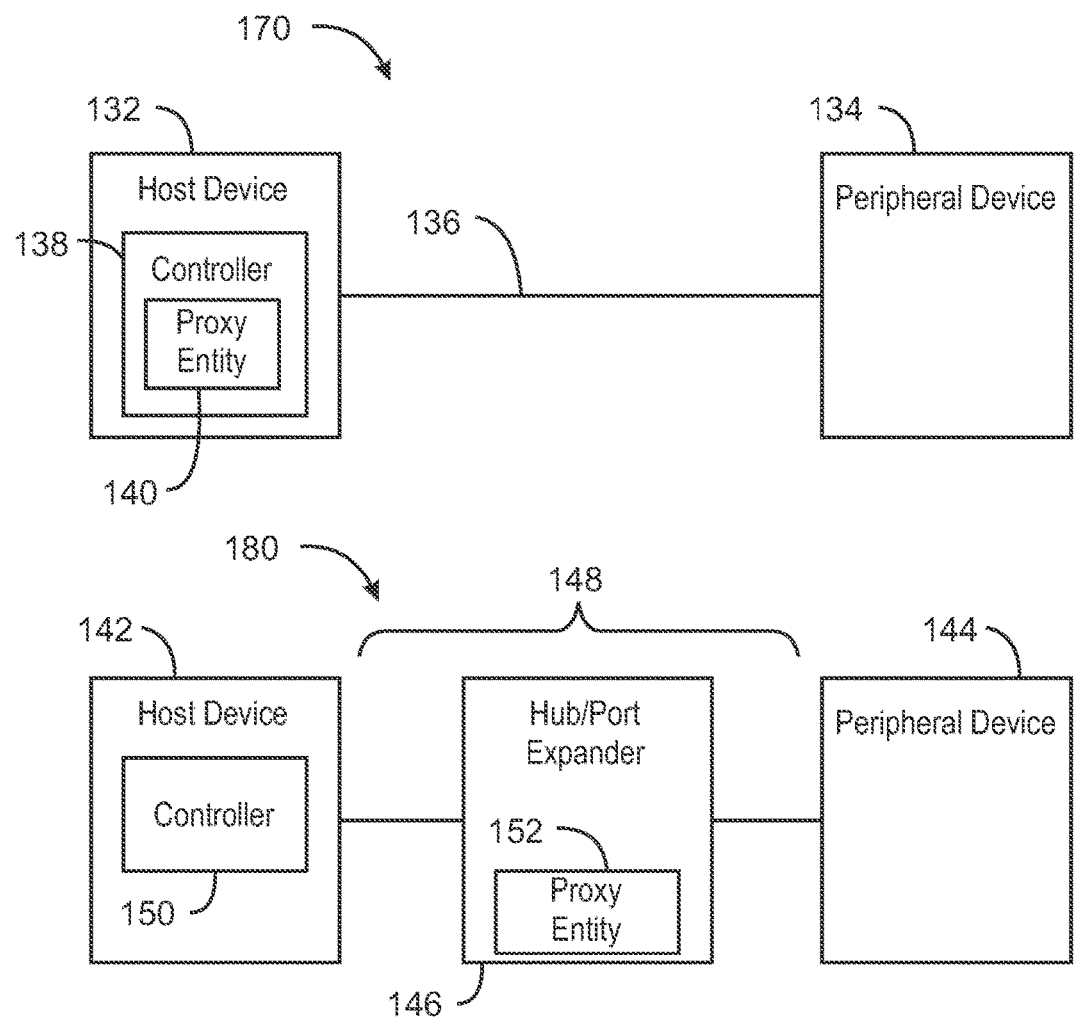
FIG. 1B is a block diagram of systems for authentication of a multiple protocol connection.

FIG. 1B is a block diagram of systems 100B for authentication of a multiple protocol connection. The block diagram includes a system 170 and a system 180. The system 170 includes a host device 132 and a peripheral device 134 coupled via a multiple protocol connection 136. The host device also includes a controller 138. The controller 138 may be the USB host controller, an embedded controller, or other controller of the host. Additionally, a controller may be associated with each port of the host. In embodiments, the controller 138 is to initiate the mutual authentication with a peripheral device 134. For example, consider a port that supports USB PD. The host controller can negotiate with the power supply of the host for authentication purposes. The host controller may also include a proxy entity 140. The proxy entity can be used to translate authentication messages across various protocols and domains. In the case where no translation is needed, the controller may perform multiple protocol authentication without the proxy entity as described herein. For example, in a port to port connection with no port expanders or USB hubs, the controller may directly perform authentication of the multiple protocol connector as described herein, without the use of a proxy entity.

The system 180 includes a host device 142 and a peripheral device 144 coupled via a multiple protocol connection 148. A hub or port expander 146 is disposed between the host device 142 and the peripheral device 144 along the multiple protocol connection 148. The host device also includes a controller 150, and the hub/port expander 146 includes a proxy 152. The proxy entity is to translate authentication messages across various protocols and domains. Thus, the proxy entity can receive an authentication message from the peripheral device 144 or host 142 in a first protocol, and then translate the authentication message into a second protocol. In this manner, authentication between the host and the device can be performed across multiple protocols or domains.

The shared connection can adhere to a variety of Specifications, such as any Specifications by the Universal Serial Bus Implementers Forum (USB-IF). The shared connection can also include any Peripheral Component Interconnect Express (PCIe) Specification, such as the PCI Express 3.0 Specification released in November 2010. The shared connection can also include any Display Port Specification of the Video Electronics Standard Association (VESA) such as the VESA DisplayPort Standard 1.3 released in September 2014. The present techniques described according to a USB Type-C connection may be according to the USB Type-C Cable and Connector Specification Revision 1.0, Aug. 11, 2014. However, any connection capable of supporting multiple protocols and Specifications can be used.

USB Type-C enables several connection types, such as USB2, USB3, PCIe, HDMI, DisplayPort, and so on. The USB2 is according to the Universal Serial Bus 2.0 Specification released April 2000. The USB3 is according to the Universal Serial Bus 3.1 Specification released on July, 2013. A High-Definition Multimedia Interface (HDMI) connection may be according to the HDMI Specification Ver. 2.0 released September 2013. The various connection types may be realized through alternate modes, as enabled by the USB Type-C Specification. In particular, the USB Type-C Specification enables signal pins to be reassigned for purposes other than a USB2/USB3 data transmission. These reassignments are called alternate modes. Each USB Type-C Port can support zero or more alternate modes.

Figure 2:
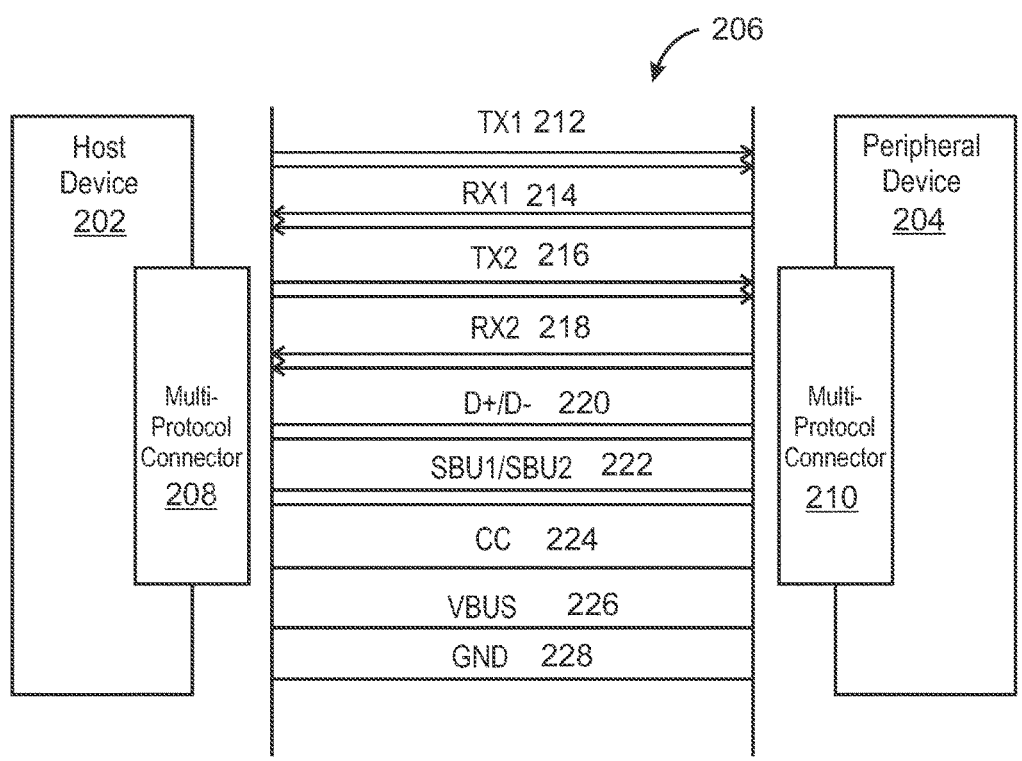
FIG. 2 is a schematic diagram of an exemplary multiple protocol connection that can support multiple protocols.

FIG. 2 is a schematic diagram of an exemplary multiple protocol connection that can support multiple protocols. A host device 202 is coupled with a peripheral device 204 via a multiple protocol connection 206. The multiple protocol connection includes a multiple-protocol 208 at the host 202, and a multiple protocol connector 210 at the peripheral device 204. Signals can be transmitted between the multi-protocol connector 208 and the multi-protocol connector 210 via various pinout and signal wires. For example, the multi-protocol connection includes a first and second transmit and receive signal lines. Specifically, a first transmit (TX1) 212, a first receive (RX1), a second transmit (TX2), and a second receive (RX2) can be used to carry data between the host device 202 and the peripheral device 204. A positive data (D+) and a negative data (D-) pair 220 can also be used to transmit data between the host device 202 and the peripheral device 204. A secondary bus 1 (SBU1) and a secondary bus 2 (SBU2) 222 can be used to transfer audio signals. Additionally, the SUB1/SBU2 222 may be used by an alternate mode, such as Display Port, that uses them for configuration and management during the implementation of the alternate mode. A communication channel (CC) 224 can be used for side band signaling. A secondary bus can also be used for sideband signaling. A Vbus 226 is to provide power to the cable bus. Finally, a ground 228 grounds the cable. Although the system 200 illustrates a straight multi-protocol connector to multi-protocol connector configuration, any other configuration can be used. For example, a multi-protocol connection may have additional transmit/receive signal lines or additional data lines. Moreover, the multi-protocol cable may include a multi-protocol connector at one end and an adapter connector at another end. For example, while the cable may have a multi-protocol connector at one end with a protocol specific connector at the other end. Accordingly, cable components can change due to the type of connector.

In embodiments, the multiple protocol connection is a connection according to the USB Type-C Specification. The multiple-protocol connector 208 at the host 202 may be a USB Type-C connector, and the multiple protocol connector 210 at the peripheral device 204 may be a USB Type-C connector. The TX1 212, RX1 214, TX2 216, and the RX2 218 can be repurposed as necessary. For example, the TX1 212, RX1 214, TX2 216, and the RX2 218 can transmit SuperSpeed Data in the case of a USB3 implementation. The D+/D- signal lines 220 can be used to transmit USB2 data between the host device 202 and the peripheral device 204.

As discussed above, many protocols can be implemented via a multi-protocol connector. For example, various protocols can be realized using a Type-C connector via an alternate mode. The USB Type-C Specification enables signal pins to be reassigned for purposes other than a USB2/USB3 data transmission as alternate modes. Both industry-standard alternate modes and vendor-proprietary alternate modes can be defined. Upon an initial connection of a peripheral device to a host device, the device is initially recognized in a first state or domain. The initial recognition of the peripheral device upon a connection to the host device includes an authentication of the device, prior to a reassignment or configuration of pins into another state, domain, or protocol.

For example, in an alternate mode according to a USB Type-C connection, the peripheral device may be initially visible either in a USB Power Delivery protocol or in USB2. In embodiments, the alternate mode is prevented if mutual authentication fails. In this manner, the alternate mode is never entered, which is where malware could do harm. In embodiments, the alternate modes may include but are not limited to, Thunderbolt, DisplayPort, or MHL.

As an example, DisplayPort can operate across a Type-C connector as via an alternate mode. DisplayPort across a Type-C connector can operate at multiple resolutions. A DisplayPort connection driving full monitor resolutions refers to 3840×2160 pixels (referring to the approximately 4000 pixel wide display), and is referred to as DisplayPort 4 k. DisplayPort 4 k can also refer to the currently less common 4096×2160 pixel resolution. DisplayPort 4 k uses four data lanes of the Type-C connector. Referring to FIG. 2, DisplayPort 4K uses TX1 212, RX1 214, TX2 216, and the RX2 218 of a Type-C connection as data lanes. The DisplayPort 4 k mode also uses the secondary bus (SBU) pins 222.

In the case of a DisplayPort High Definition (HD) implementation of the USB Type-C connector, the TX2 216 and RX2 218 can be repurposed to carry 2 lanes of DisplayPort data resulting in a resolution of 1080p (1920×1080 pixels). This implementation of DisplayPort uses two data lanes of the Type-C connector and results in a lower display resolution when compared to DisplayPort 4 k. Similarly, PCI-Express can also operate across the USB Type-C connector via two lanes of data. The alternate mode combinations described herein are for exemplary purposes. Any alternate modes (including a near-infinite number of vendor-proprietary alternate modes) can be used according to the present techniques.

Accordingly, alternate modes are implemented to repurpose signal lines for each particular standard or Specification specific data transmission across a multi-protocol connector. In the case of a USB Type-C connection, the peripheral device is initially restricted to USB2 or USB PD signaling upon connection to a host device. The device is authenticated within the USB2 or USB PD domain. The first mode or domain, such as USB2 or USB PD, is used to authenticate each device connected to a host system via a USB Type-C connection and also to negotiate entry to each alternate mode. If the authentication fails, the host prevents mapping of signals to implement the alternate mode. In embodiments, USB 3.1 can also be used to authenticate a peripheral device. However, USB 3.1 is an unlikely candidate as it is more expensive and not on all ports.

In embodiments, some alternate modes can cause a device to appear as a port expansion upon connection to a host device. In other words, the device appears as a port expander with multiple connections. An alternate mode that appears as a port expansion to the host device may not initially run the expected first state or domain used to complete authentication. However, a proxy entity can be implemented to drive the apparent hub into an expected domain to complete authentication. The proxy entity is software, hardware, or any combination thereof, that is used on an initial connection to enable an expected environment for authentication.

In examples, Thunderbolt can operate as an alternate mode across a USB Type-C connection. The topology of Thunderbolt appears as a quasi-port expansion. Thunderbolt does not run USB2 prior to entering an alternate mode, thus a proxy entity is to convert from an initial domain to a domain where authentication is possible. In the prior example, the proxy entity can be used to convert USB Power Delivery (PD) to USB2, resulting in a move from the PD domain to the USB domain to do the authentication. In this manner, a device supporting Thunderbolt can be authenticated in accordance with the present techniques. A device that natively supports USB2 may be authenticated without the use of a proxy entity. For example, Thunderbolt with native USB2 support can directly use USB2 for authentication, without a translation from the USB PD domain to USB2.

Accordingly, to implement authentication regardless of the type of device connected to the host, a proxy entity can be used to discover the capabilities of the device, and restrict communications with the host until authentication is verified and complete. In the case of a power supply or power adapter as the device coupled to the downstream port of a USB hub via a USB Type-C connector, the proxy entity can be used to convert from the power delivery domain to the USB domain in order to communicate back with the host to complete the authentication. Since USB PD is a local (port to port) connection, USB PD communications will arrive at the host for authentication. In embodiments, domain translations may be used to communicate with the host for authentication.

Figure 3A:
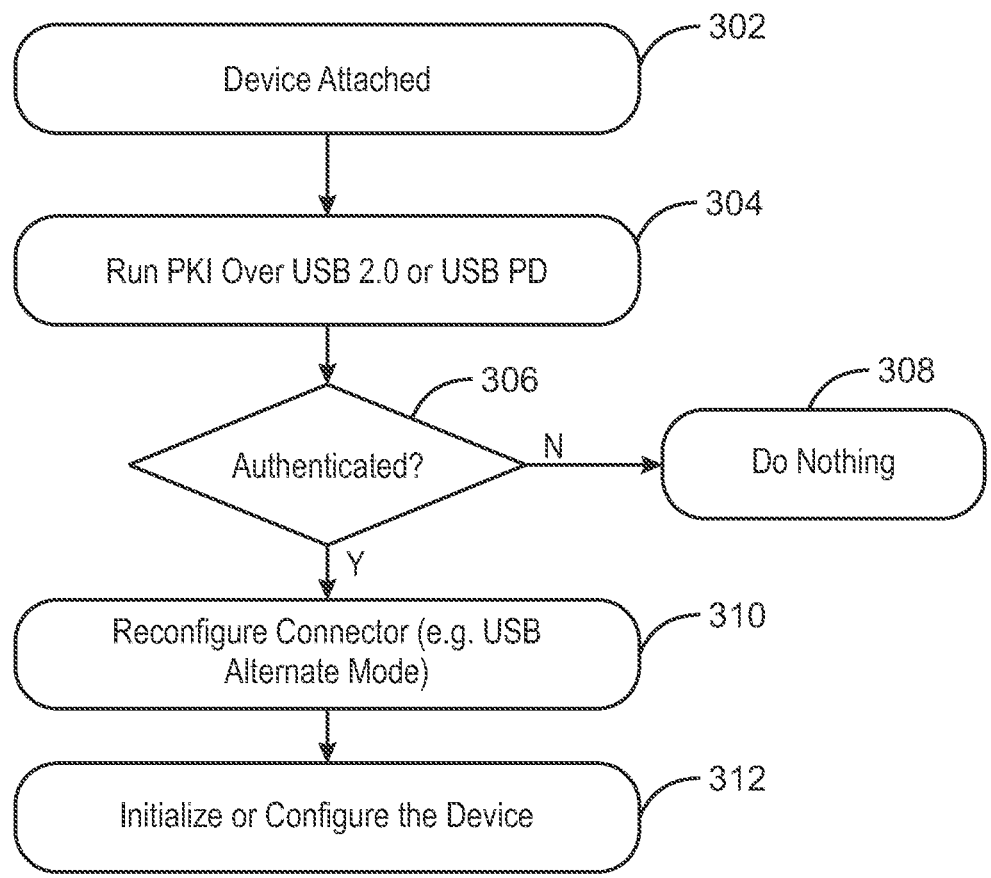
FIG. 3A is a process flow diagram describing a method for authentication of a multiple protocol connection.

FIG. 3A is a process flow diagram describing a method 300A for authentication of a multiple protocol connection. At block 302, a device is attached to a host device via a multi-protocol connection. Attachment of the device may include physically coupling the device with a host device via a multi-protocol connector. Attachment of the device may also include physically powering on a device already coupled with the host device.

At block 304, mutual authentication occurs. In embodiments, the mutual authentication is a public key infrastructure (PKI). In embodiments, the device is authenticated prior to being initialized. In this manner, the device is authenticated before being visible to the operating system. Additionally, the PKI may be executed during an initialization of the device. The PKI may include a manageability engine. At block 306, it is determined if the device is authenticated. If the device is not authenticated, process flow continues to block 308. If the device is authenticated, process flow continues to block 310. At block 308, the device is not authenticated, and no further configuration of the device occurs. In embodiments, the device is not recognized by the host system. A policy may define how a non-authenticated device is handled. At block 310, the device is authenticated and reconfiguration of the device is enabled. The device can be reconfigured according to any alternate mode. At block 312, the device is initialized or configured. In embodiments, the initialization/configuration is implemented place using the alternate mode's driver stack.

In embodiments, a controller of the host is to initiate the mutual authentication with a peripheral device. The controller may be associated with a port of the host. For example, consider a port that supports USB PD. The host controller can negotiate with the power supply of the host for authentication purposes. In some embodiments, the key associated with mutual authentication is stored by a manageability engine. A common set of certificates can be stored by the manageability engine. Further, in some embodiments, the key associated with mutual authentication is stored by the OS or in an embedded controller in other locations.

Specifically, mutual authentication or two-way authentication refers to two parties authenticating each other at the same time. In embodiments, the host and the peripheral device authenticate one another. In this manner, both the host and the peripheral device can be assured of the other's identity. A public key infrastructure (PKI) is a set of hardware, software, people, policies, and procedures needed to create, manage, distribute, use, store, and revoke digital certificates and manage public-key encryption. The purpose of a PKI is to facilitate the secure electronic transfer of information, such as certificates authenticating the host and peripheral device. In embodiments, mutual authentication such as PKI is enabled in a first domain to enable the host, based on its policy, to admit or authenticate a device that operates in another domain. In embodiments, the peripheral device, based on its policy, can authenticate and communicate with the host. In embodiments, admitting the device is not be the same as allowing it to be visible to the OS. Admitting the device may enable the device to access only the host resources necessary of minimal operation of the device.

For example, a thumb drive may mutually authenticate with the host upon being attached to the host through the use of a key created mutually during the PKI certificate exchange. In turn, a security policy on the host side receives the key from the thumb drive, and determines if the key is recognized. In embodiments, the key created during the PKI certificate exchange may be used to generate sub-keys that can be individually associated with separate policies in the device or host. Accordingly, a policy can be used to determine if the device recognizes or is mutually authenticated with the host. If the device recognizes or is mutually authenticated with the host, the policy enables the device to provide data. If either side (host or device) fails, the respective policy fails. Because the policies fail, the credentials do not match and either the host will not allow the drive to be recognized as the drive won't provide data to the host.

In embodiments, attacks using counterfeit hardware are prevented. In an exemplary attack with a power supply, counterfeit hardware can be used to alter the normal power supply mode where the power supply could communicate. By encrypting authentication in a first domain, a counterfeit power supply would be unable to complete the authentication process. In embodiments, authentication occurs around the connector, using one bus essentially to authenticate communication and potentially create keys for communication of the process.

Policies can be used to determine the actions taken by the host and the device prior to, during, and in response to authentication. For example, when a laptop is coupled with a device that asserts it is a display. If device authenticates as a display, a host policy may enable special features. However, if the device is not authenticated, basic display capabilities may be used. In embodiments, if the device is not authenticated, all capabilities of the device may be blocked. As another example, consider a storage device that does not support authentication and cannot produce authentication credentials. In such a scenario, a policy of the host may be to completely block communication with the device. In some examples, the device may be a storage device. Accordingly, in embodiments, an unauthenticated device is not visible to the USB Host Controller. However, dependent on the specific implementation, the device may (1) be visible to the OS, may (2) be visible to the host controller, but not the OS, and (3) may be visible to neither the host controller nor the OS. A policy of the device may operate at various different levels, from prohibiting communications with the device altogether, to giving the device access to certain resources, to treating the device as a fully blown, secure device in response to the type of device and the authentication of the device.

The peripheral device may also include policies that are implemented in response to the connection and authentication of the device. Without valid credentials or any credentials, the device may be restricted from exposing data, or exposing only empty space. In embodiments, the device can destroy all data in response to not connecting and mutually authenticating with a host. Additionally, in embodiments, the device may also connect with a remote server in response to not mutually authenticating with a host. The device most likely to have its own policy is a security device.

For example, consider a device that upon a connection to a host, is authenticated in a USB PD and USB2, if necessary. In particular, the communication used for authentication may be translated across USB PD and USB2 depending on the capabilities of the host and the device. Upon successful authentication, the host may expose its exposed full functionality on USB PD, USB2/3 and for alternate modes. Similarly, the device may expose its exposed full functionality on USB PD, USB2/3 and for alternate modes. However, if authentication fails, the device may be "bricked" such that it is un-useable and not recognized by the OS. The device may also delete all files contained by the device. The actions of the host and device upon a successful or unsuccessful authentication are according to the host policy and the device policy, respectively.

Figure 3B:
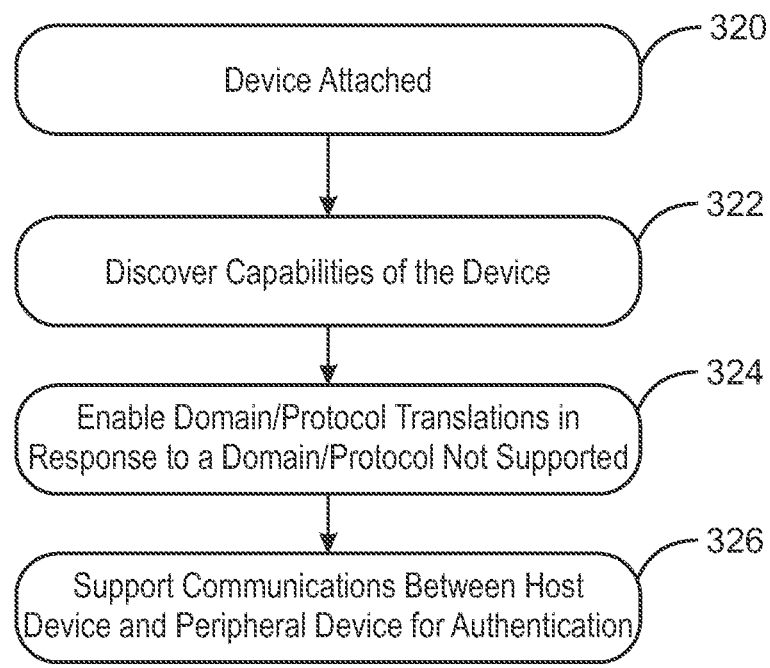
FIG. 3B is a process flow diagram describing a method for implementing a proxy entity.

FIG. 3B is a process flow diagram describing a method 300B for implementing a proxy entity. At block 320, a device is attached to a host device via a multi-protocol connection. Attachment of the device may include physically coupling the device with a host device via a multi-protocol connector. Attachment of the device may also include physically powering on a device already coupled with the host device. At block 322, capabilities of the host and the device are discovered. In embodiments, the capabilities include the particular domain or protocol that the host and the device can support.

At block 324, domain or protocol translations are enabled in response to a particular domain or protocol not supported by the host or the device. For example, the proxy entity may translate an authentication message across multiple protocols to traverse a USB hub that may be coupled with the host device and the peripheral device. In some cases, the USB hub may not support communications according to a USB2 protocol. In this case, authentication messages can be sent to the proxy entity using a USB PD protocol. The proxy entity can then translate the messages to a second protocol, such as USB2.

At block 326, communications between the host and the peripheral device for authentication are supported. In this manner, authentication can occur between a host and a device, regardless of the capabilities of the host and the device. The peripheral device can be restricted to a first domain or protocol until authentication is successful. In embodiments, the peripheral device is authenticated prior to being initialized.

Figure 4:
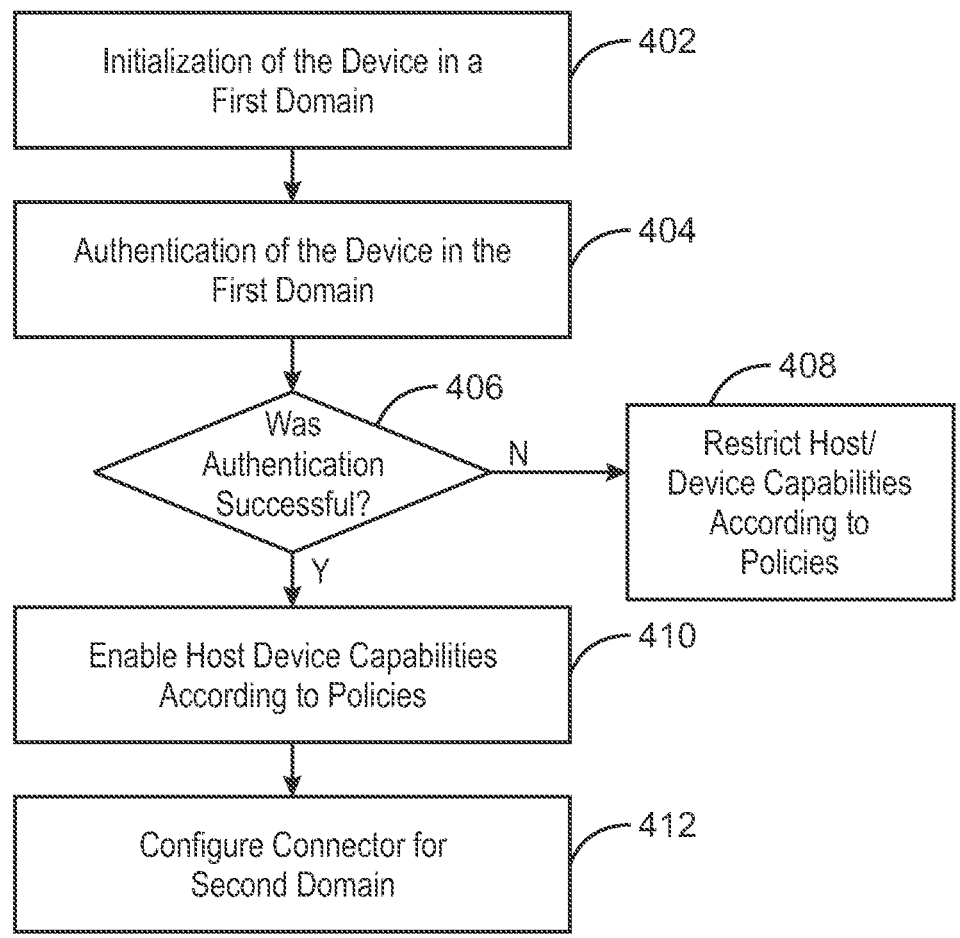
FIG. 4 is a process flow diagram describing a method for authentication of a multiple protocol connection according to policies.

FIG. 4 is a process flow diagram describing a method 400 for authentication of a multiple protocol connection according to policies. At block 402 the device is initialized in a first domain. At block 404, the device is authenticated in the first domain. At block 406, it is determined if authentication of the device was successful. If authentication of the device was not successful, process flow continues to block 408. I if authentication of the device was successful. If authentication of the device was successful, process flow continues to block 410. At block 408, the host and device capabilities are restricted according to the policies of the host and the policies of the device. At block 410 host and device capabilities are enables according to the policies of the host and the device. At block 412, the connector is configured for operation in a second domain.

In embodiments, the host controller may be bifurcated such that a portion of the host controller is not visible to the operating system of the host. In such a scenario, the policies of the host device may restrict partially authenticated devices from visibility by the operating system. Additionally, in the case of a USB hub, a proxy entity is used to convert an initialization in USB PD to a USB2 domain where authentication can be performed. When a USB Type-C connector is present, all authentication may be done across the CC within the USB PD domain. In such a scenario, the peripheral device is connected directly to the host, and a USB hub is not present.

USB PD transmissions are not transmitted across USB hubs. Accordingly, when a USB hub is present, authentication via USB PD may not occur. Typically, USB hubs can be defined as USB port expanders with USB PD is available as defined by the USB Power Delivery Specification from port to port. Because USB2 is supported by USB port expanders, USB2 may be used as a standard domain by which to authenticate USB Type-C connectors to traverse a USB hub. Authentication can return to USB PD signaling, if necessary, to connect to another port.

Figure 5:
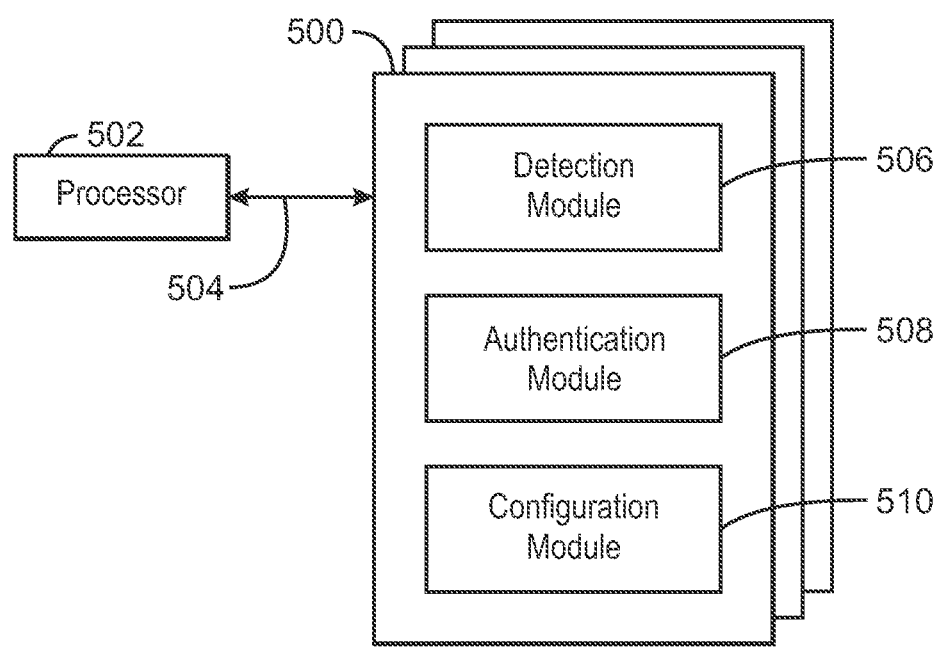
FIG. 5 is a block diagram showing tangible, non-transitory computer-readable media that stores code for authentication of a multi-protocol device.

FIG. 5 is a block diagram showing tangible, non-transitory computer-readable media 500 that stores code for authentication of a multi-protocol device. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. For example, a detection module 506 may be configured to detect the connection of a peripheral device to the host. The detection module may also determine the operable protocol of the peripheral device. An authentication module 508 may be configured to authenticate the device in a first protocol or domain. At block 510, a configuration module can reconfigure the peripheral device in the operable domain in response to a successful authentication and communication between the host and peripheral device may occur based on the host and device policies. If authentication is not successful, the host and the device can be configured according to policies of both the host and the device.

The block diagram of FIG. 5 is not intended to indicate that the tangible, non-transitory computer-readable media 500 is to include all of the components shown in FIG. 5. Further, the tangible, non-transitory computer-readable media 800A may include any number of additional components not shown in FIG. 5, depending on the details of the specific implementation.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Referring now to FIG. 6, a block diagram of components present in a computer system in accordance with an embodiment of the present invention is illustrated. As shown in FIG. 6, system 600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 6 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below. In embodiments, the interconnects described below may be implemented via alternate modes of a USB Type-C connection.

As seen in FIG. 6, a processor 610, in one embodiment, includes a microprocessor, multi-core processor, multi-threaded processor, an ultra-low voltage processor, an embedded processor, or other known processing element. In the illustrated implementation, processor 610 acts as a main processing unit and central hub for communication with many of the various components of the system 600. As one example, processor 600 is implemented as a system on a chip (SoC). As a specific illustrative example, processor 610 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 610 in one implementation will be discussed further below to provide an illustrative example.

Processor 610, in one embodiment, communicates with a system memory 615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 620 may also couple to processor 610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 6, a flash device 622 may be coupled to processor 610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in an mSATA or NGFF slot. As an example, an SSD has a capacity ranging from 120 GB-1 TB.

Various input/output (IO) devices may be present within system 600. Specifically shown in the embodiment of FIG. 6 is a display 624 which may be a high definition LCD or LED panel configured within a lid portion of the chassis. This display panel may also provide for a touch screen 625, e.g., adapted externally over the display panel such that via a user's interaction with this touch screen, user inputs can be provided to the system to enable desired operations, e.g., with regard to the display of information, accessing of information and so forth. In one embodiment, display 624 may be coupled to processor 610 via a display interconnect that can be implemented as a high performance graphics interconnect. Touch screen 625 may be coupled to processor 610 via another interconnect, which in an embodiment can be an I$^2$C interconnect. As further shown in FIG. 6, in addition to touch screen 625, user input by way of touch can also occur via a touch pad 630 which may be configured within the chassis and may also be coupled to the same I$^2$C interconnect as touch screen 625.

The display 624 is coupled to the processor 610 via a MUX 672. The MUX 672 may be used to select between various USB features enabled via a USB Type-C interconnect. For example, the MUX 672 may be used to implement USB2, USB 3.1, USB Battery Charging, USB Power Delivery, HDMI, DisplayPort, or PCIe, among others. The MUX 672 may also enable flipping of the USB signals.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 4:3 or 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited 10 interference when using multi-touch.

For perceptual computing and other purposes, various sensors may be present within the system and may be coupled to processor 610 in different manners. Certain inertial and environmental sensors may couple to processor 610 through a sensor hub 640, e.g., via an I$^2$C interconnect. In the embodiment shown in FIG. 6, these sensors may include an accelerometer 641, an ambient light sensor (ALS) 642, a compass 643 and a gyroscope 644. Other environmental sensors may include one or more thermal sensors 646 which in some embodiments couple to processor 610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 6, various peripheral devices may couple to processor 610 via a low pin count (LPC) interconnect. In the embodiment shown, various components can be coupled through an embedded controller 635. Such components can include a keyboard 636 (e.g., coupled via a PS2 interface), a fan 637, and a thermal sensor 639. In some embodiments, touch pad 630 may also couple to EC 635 via a PS2 interface. In addition, a security processor such as a trusted platform module (TPM) 638 in accordance with the Trusted Computing Group (TCG) TPM Specification Version 1.2, dated Oct. 2, 2003, may also couple to processor 610 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.1 Specification (August 2014), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick. In some embodiments, USB Type-C ports may be used for one or more of the following signal types separately or in combination: USB2, USB3, Analog Audio, Digital Audio, power delivery, Display Port, HDMI, PCI-Express, and others; including numerous vendor-proprietary signaling schemes.

System 600 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 645 which may communicate, in one embodiment with processor 610 via an SMBus. Note that via this NFC unit 645, devices in close proximity to each other can communicate. For example, a user can enable system 600 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 6, additional wireless units can include other short range wireless engines including a WLAN unit 650 and a Bluetooth unit 652. Using WLAN unit 650, Wi-Fi™ communications in accordance with a given Institute of Electrical and Electronics Engineers (IEEE) 802.11 standard can be realized, while via Bluetooth unit 652, short range communications via a Bluetooth protocol can occur. These units may communicate with processor 610 via, e.g., a USB link or a universal asynchronous receiver transmitter (UART) link. Or these units may couple to processor 610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 656 which in turn may couple to a subscriber identity module (SIM) 657. In addition, to enable receipt and use of location information, a GPS module 655 may also be present. Note that in the embodiment shown in FIG. 6, WWAN unit 656 and an integrated capture device such as a camera module 654 may communicate via a given USB protocol such as a USB2 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11 abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 660, which may couple to processor 610 via a high definition audio (HDA) link. Similarly, DSP 660 may communicate with an integrated coder/decoder (CODEC) and amplifier 662 that in turn may couple to output speakers 663 which may be implemented within the chassis. Similarly, amplifier and CODEC 662 can be coupled to receive audio inputs from a microphone 665 which in an embodiment can be implemented via dual array microphones (such as a digital microphone array) to provide for high quality audio inputs to enable voice-activated control of various operations within the system. Note also that audio outputs can be provided from amplifier/CODEC 662 to a headphone jack 664. Although shown with these particular components in the embodiment of FIG. 6, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 635. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 6, understand the scope of the present invention is not limited in this regard. In some embodiments, the EC 635 may be coupled with the processor 601 via a USB PD signal 670.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 6 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Example 1

An apparatus for authentication of a multiple protocol connection is described herein. The apparatus comprises a controller and a proxy entity. The controller is to detect a peripheral device and authenticate the peripheral device according to a first protocol. The proxy entity is to configure the peripheral device in an operable protocol in response to the authentication with a host.

In examples, the host and the peripheral device can be coupled via a multi-protocol connection. The host and the device may also be peripheral coupled via a USB Type-C connection. The first protocol may be a Universal Serial Bus 2.0 protocol. The first protocol may also be a Universal Serial Bus power Delivery protocol. In examples, the proxy entity may translate an authentication message across multiple protocols to traverse a USB hub that may be coupled with the host device and the peripheral device. The authentication may be performed via a mutual authentication. The authentication may also be performed via a public key infrastructure. In examples, the host may communicate with the peripheral device based on a host policy. The host policy may prevent the presence of the peripheral device from becoming visible to an operating system of the host. The device, based on its policy, may communicate with the host.

Example 2

A method for authentication of a multiple protocol connection is described herein. The method comprises determining a first domain based on a device configuration and authenticating, by a host, a device in the first domain. The method also comprises reconfiguring the device to operate in a second domain based on the authentication of the device in the first domain.

The first domain may be determined by detecting the device configuration using a proxy entity. In examples, the host and the device may be coupled via a multi-domain connection. The host and the device may also be coupled via a USB Type-C connection. The first domain may be a Universal Serial Bus 2.0 protocol. Additionally, the first domain may be a Universal Serial Bus Power Delivery protocol. The authentication may be performed via mutual authentication. In examples, the authentication may be performed via a public key infrastructure. Additionally, the host may admit the device, without the device being visible to an operating system of the host device. Further, the device, based on its policy, may communicate with the host.

Example 3

A system for authentication of a multiple protocol connection is described herein. The system comprises a host device, a peripheral device, and a controller. The host device and the peripheral device are to mutually authenticate in a first domain. The controller is to configure the peripheral device in an operable domain in response to the authentication.

In examples, the host and the peripheral device may be coupled via a multi-domain connection. Additionally, the host and the device may be peripheral coupled via a USB Type-C connection. The first domain may be a Universal Serial Bus 2.0 domain. The first domain may also be a Universal Serial Bus power Delivery domain. The proxy entity may translate an authentication message across multiple domains to traverse a USB hub that may be coupled with the host device and the peripheral device. The authentication may be performed via a public key infrastructure. In examples, in response to the authentication, the peripheral device may be initialized. Further, in response to the authentication, the host device and the peripheral device may operate according to a respective policy. The controller may also initiate the mutual authentication between the host device and the peripheral device.

Example 4

An apparatus for authentication of a multiple protocol connection is described herein. The apparatus comprises a means to authenticate the peripheral device according to a first protocol and to detect the peripheral device and. The apparatus also comprises a proxy entity that is to configure the peripheral device in an operable protocol in response to the authentication.

In examples, the host and the peripheral device may be coupled via a multi-protocol connection. The host and the peripheral device may be coupled via a USB Type-C connection. Additionally, the first protocol may be a Universal Serial Bus 2.0 protocol. The first protocol may also be a Universal Serial Bus Power Delivery protocol. The proxy entity may translate an authentication message from the means to authenticate the peripheral device across multiple domains to traverse a USB hub that may be coupled with the host device and the peripheral device. In examples, the means to authenticate the peripheral device enables mutual authentication between the host device and the peripheral device. The means to authenticate the peripheral device may be enabled via a public key infrastructure. The host may communicate with the peripheral device based on a host policy. The host policy may prevent the presence of the peripheral device from becoming visible to an operating system of the host. Further, the device, based on its policy, may communicate with the host.

Example 5

A tangible, non-transitory, computer-readable medium comprising code is described herein. The code is to direct a processor to determine a first domain based on a device configuration and authenticate, by a host, a device in the first domain. The code is also to reconfigure the device to operate in a second domain based on the authentication of the device in the first domain.

In examples, the first domain may be determined by detecting the device configuration using a proxy entity. The host and the device may be coupled via a multi-domain connection. The host and the device may also be coupled via a USB Type-C connection. In examples, the first domain may be Universal Serial Bus 2.0. The first domain may also be Universal Serial Bus Power Delivery. Further, the authentication may be performed via mutual authentication. The authentication may also be performed via a public key infrastructure. The host may admit the device, without the device being visible to an operating system of the host device. The device, based on its policy, may communicate with the host.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus for authentication of a multiple protocol connection, comprising:
 a processor that is at least partially hardware to detect a peripheral device and authenticate the peripheral device in a first protocol via an authentication message, wherein the authentication message is translated into at least a second protocol to traverse a hub disposed between a host device and the peripheral device, and in response to the peripheral device being authenticated, the peripheral device is configured in an operable protocol, wherein the host and the peripheral device are coupled via a multi-protocol connection.

2. The apparatus of claim 1, wherein the host and the peripheral device are coupled via a USB Type-C connection.

3. The apparatus of claim 1, wherein the first protocol is a Universal Serial Bus 2.0 protocol.

4. The apparatus of claim 1, wherein the first protocol is a Universal Serial Bus Power Delivery protocol.

5. The apparatus of claim 1, wherein the authentication is performed via a mutual authentication.

6. The apparatus of claim 1, wherein the authentication is performed via a public key infrastructure.

7. The apparatus of claim 1, wherein the host communicates with the peripheral device based on a host policy.

8. The apparatus of claim 7, wherein the host policy prevents the presence of the peripheral device from becoming visible to an operating system of the host.

9. The apparatus of claim 1, wherein the peripheral device, based on its policy, is to communicate with the host.

10. A method for authentication of a multiple protocol connection, comprising:
 determining a first domain based on a peripheral device configuration;
 authenticating, by a host, the peripheral device in the first domain via an authentication message;
 translating the authentication message into at least a second domain in response to the first domain being unsupported by the peripheral device to traverse a hub disposed between a host device and the peripheral device; and
 reconfiguring the device to operate in a second domain based on the authentication of the peripheral device in the first domain, wherein the host and the peripheral device are coupled via a multi-protocol connection.

11. The method of claim 10, comprising determining the first domain by detecting the device configuration using a proxy entity.

12. The method of claim 10, wherein the host and the device are coupled via a multi-domain connection.

13. The method of claim 10, wherein the host and the device are coupled via a USB Type-C connection.

14. The method of claim 10, wherein the first domain is a Universal Serial Bus 2.0 protocol.

15. The method of claim 10, wherein the first domain is Universal Serial Bus Power Delivery protocol.

16. A system for authentication of a multiple protocol connection, comprising:

a host device;

a peripheral device, wherein the host device and the peripheral device are to mutually authenticate in a first domain via a translation from the first domain to the second domain, wherein an authentication message is translated from the first domain to the second domain to traverse a hub disposed between the host device and the peripheral device; and a controller that is to configure the peripheral device in an operable domain in response to the authentication, wherein the host and the peripheral device are coupled via a multi-protocol connection.

17. The system of claim 16, wherein the host device and the peripheral device are coupled via a multi-domain connection.

18. The system of claim 16, wherein the host device and the peripheral device are coupled via a USB Type-C connection.

19. The system of claim 16, wherein the first domain is a Universal Serial Bus 2.0 domain.

20. The system of claim 16, wherein the first domain is a Universal Serial Bus Power Delivery domain.

21. The system of claim 16, wherein the authentication is performed via a public key infrastructure.

22. The system of claim 16, wherein in response to the authentication, the peripheral device is initialized.

* * * * *